(12) United States Patent
Manbeck

(10) Patent No.: US 10,467,731 B2
(45) Date of Patent: Nov. 5, 2019

(54) AUTOMATIC DEFECTIVE DIGITAL MOTION PICTURE PIXEL DETECTION

(71) Applicant: MTI Film, LLC, Providence, RI (US)

(72) Inventor: Kevin Manbeck, Eden Prairie, MN (US)

(73) Assignee: MTI Film, LLC, Providence, RI (US)

(*) Notice: Subject to any disclaimer, the term of this patent is extended or adjusted under 35 U.S.C. 154(b) by 0 days.

(21) Appl. No.: 16/276,850

(22) Filed: Feb. 15, 2019

(65) Prior Publication Data

US 2019/0188832 A1 Jun. 20, 2019

Related U.S. Application Data

(62) Division of application No. 14/978,447, filed on Dec. 22, 2015, now Pat. No. 10,229,481.

(51) Int. Cl.
*G06T 5/00* (2006.01)
*H04N 5/14* (2006.01)
*H04N 5/367* (2011.01)

(52) U.S. Cl.
CPC ............. *G06T 5/005* (2013.01); *H04N 5/145* (2013.01); *H04N 5/3675* (2013.01); *G06T 2207/10016* (2013.01)

(58) Field of Classification Search
CPC ........ G06T 5/005; H04N 5/145; H04N 5/3675
See application file for complete search history.

(56) References Cited

U.S. PATENT DOCUMENTS

| 8,643,751 | B2 | 2/2014 | Cho et al. ................ 348/246 |
| 8,837,852 | B2 | 9/2014 | Park et al. ............... 382/262 |
| 10,025,988 | B2 * | 7/2018 | Yuan .................. G06K 9/00744 |
| 2010/0157147 | A1 * | 6/2010 | Bellers .................. H04N 7/012 348/448 |
| 2011/0311147 | A1 * | 12/2011 | Pahalawatta .......... G06T 7/0002 382/197 |
| 2013/0182971 | A1 * | 7/2013 | Leontaris ............... G06T 5/002 382/275 |

* cited by examiner

*Primary Examiner* — Antoinette T Spinks
(74) *Attorney, Agent, or Firm* — Sunstein Kann Murphy & Timbers LLP

(57) ABSTRACT

A computer-implemented method for automatically identifying defective pixels captured by a motion picture camera within a sequence of frames is disclosed. The method comprises applying a spatio-temporal metric for each pixel in each frame. The metrics are analyzed to determine which pixels have values exceeding a threshold. The operator is provided a graphical display allowing the operator to select either to repair and store the repaired frame with the sequence of motion picture frames of pixel data or just store the sequence of motion picture frames of pixel data.

1 Claim, 15 Drawing Sheets

| 0 | 0 | 0 | 0 | 1 | 131 | 247 | 321 | 247 | 131 | 1 | 0 | 0 | 0 | 0 |
|---|---|---|---|---|---|---|---|---|---|---|---|---|---|---|
| 0 | 0 | 0 | 159 | 529 | 650 | 650 | 650 | 650 | 650 | 529 | 159 | 0 | 0 | 0 |
| 0 | 0 | 255 | 642 | 650 | 650 | 650 | 650 | 650 | 650 | 650 | 642 | 255 | 0 | 0 |
| 0 | 159 | 642 | 650 | 650 | 650 | 650 | 650 | 650 | 650 | 650 | 650 | 642 | 159 | 0 |
| 1 | 529 | 650 | 650 | 650 | 650 | 650 | 650 | 650 | 650 | 650 | 650 | 650 | 529 | 1 |
| 131 | 650 | 650 | 650 | 650 | 650 | 650 | 650 | 650 | 650 | 650 | 650 | 650 | 650 | 131 |
| 274 | 650 | 650 | 650 | 650 | 650 | 650 | 650 | 650 | 650 | 650 | 650 | 650 | 650 | 274 |
| 321 | 650 | 650 | 650 | 650 | 650 | 650 | 650 | 650 | 650 | 650 | 650 | 650 | 650 | 321 |
| 274 | 650 | 650 | 650 | 650 | 650 | 650 | 650 | 650 | 650 | 650 | 650 | 650 | 650 | 274 |
| 131 | 650 | 650 | 650 | 650 | 650 | 650 | 650 | 650 | 650 | 650 | 650 | 650 | 650 | 131 |
| 1 | 529 | 650 | 650 | 650 | 650 | 650 | 650 | 650 | 650 | 650 | 650 | 650 | 529 | 1 |
| 0 | 159 | 642 | 650 | 650 | 650 | 650 | 650 | 650 | 650 | 650 | 650 | 642 | 159 | 0 |
| 0 | 0 | 255 | 642 | 650 | 650 | 650 | 650 | 650 | 650 | 650 | 642 | 255 | 0 | 0 |
| 0 | 0 | 0 | 159 | 529 | 650 | 650 | 650 | 650 | 650 | 529 | 159 | 0 | 0 | 0 |
| 0 | 0 | 0 | 0 | 1 | 131 | 247 | 321 | 247 | 131 | 1 | 0 | 0 | 0 | 0 |

*FIG. 4* x =

| 9 | 9 | -3 | -3 | 9  | 1 |
|---|---|----|----|----|---|
| 9 | 4 | -3 | -2 | 6  | 1 |
| 9 | 1 | -3 | -1 | 3  | 1 |
| 9 | 0 | -3 | 0  | 0  | 1 |
| 9 | 1 | -3 | 1  | -3 | 1 |
| 9 | 4 | -3 | 2  | -6 | 1 |
| 9 | 9 | -3 | 3  | -9 | 1 |
| 4 | 9 | -2 | -3 | 6  | 1 |
| 4 | 4 | -2 | -2 | 4  | 1 |
| 4 | 1 | -2 | -1 | 2  | 1 |
| 4 | 0 | -2 | 0  | 0  | 1 |
| 4 | 1 | -2 | 1  | -2 | 1 |
| 4 | 4 | -2 | 2  | -4 | 1 |
| 4 | 9 | -2 | 3  | -6 | 1 |
| 1 | 9 | -1 | -3 | 3  | 1 |
| 1 | 4 | -1 | -2 | 2  | 1 |
| 1 | 1 | -1 | -1 | 1  | 1 |
| 1 | 1 | -1 | 1  | -1 | 1 |
| 1 | 4 | -1 | 2  | -2 | 1 |
| 1 | 9 | -1 | 3  | -3 | 1 |
| 0 | 9 | 0  | -3 | 0  | 1 |
| 0 | 4 | 0  | -2 | 0  | 1 |

*FIG. 7-1*

| 0 | 4 | 0 | 2 | 0 | 1 |
|---|---|---|---|---|---|
| 0 | 9 | 0 | 3 | 0 | 1 |
| 1 | 9 | 1 | -3 | -3 | 1 |
| 1 | 4 | 1 | -2 | -2 | 1 |
| 1 | 1 | 1 | -1 | -1 | 1 |
| 1 | 1 | 1 | 1 | 1 | 1 |
| 1 | 4 | 1 | 2 | 2 | 1 |
| 1 | 9 | 1 | 3 | 3 | 1 |
| 4 | 9 | 2 | -3 | -6 | 1 |
| 4 | 4 | 2 | -2 | -4 | 1 |
| 4 | 1 | 2 | -1 | -2 | 1 |
| 4 | 0 | 2 | 0 | 0 | 1 |
| 4 | 1 | 2 | 1 | 2 | 1 |
| 4 | 4 | 2 | 2 | 4 | 1 |
| 4 | 9 | 2 | 3 | 6 | 1 |
| 9 | 9 | 3 | -3 | -9 | 1 |
| 9 | 4 | 3 | -2 | -6 | 1 |
| 9 | 1 | 3 | -1 | -3 | 1 |
| 9 | 0 | 3 | 0 | 0 | 1 |
| 9 | 1 | 3 | 1 | 3 | 1 |
| 9 | 4 | 3 | 2 | 6 | 1 |
| 9 | 9 | 3 | 3 | 9 | 1 |

| 1 | 0 | -1 | 0  | 0 | 1 |
|---|---|----|----|---|---|
| 0 | 1 | 0  | -1 | 0 | 1 |
| 0 | 0 | 0  | 0  | 0 | 1 |
| 0 | 1 | 0  | 1  | 0 | 1 |
| 1 | 0 | 1  | 0  | 0 | 1 |

*FIG. 8* w =

| 4 | 0 | -2 | 0  | 0  | 1 |
|---|---|----|----|----|---|
| 1 | 1 | -1 | -1 | 1  | 1 |
| 1 | 1 | -1 | 1  | -1 | 1 |
| 0 | 4 | 0  | -2 | 0  | 1 |
| 0 | 4 | 0  | 2  | 0  | 1 |
| 1 | 1 | 1  | -1 | -1 | 1 |
| 1 | 1 | 1  | 1  | 1  | 1 |
| 4 | 0 | 2  | 0  | 0  | 1 |

*FIG. 9A*

|   |   |   |   |   |   |   |
|---|---|---|---|---|---|---|
|   |   |   | w |   |   |   |
|   |   | w | v | w |   |   |
|   | w | v | v | v | w |   |
|   |   | w | v | w |   |   |
|   |   |   | w |   |   |   |
|   |   |   |   |   |   |   |

| | | | |
|---|---|---|---|
| 0.0104 | 0.0104 | -0.0155 | -0.0155 |
| 0.0090 | 0.0005 | -0.0155 | -0.0103 |
| 0.0082 | -0.0055 | -0.0155 | -0.0052 |
| 0.0079 | -0.0075 | -0.0155 | 0.0000 |
| 0.0082 | -0.0055 | -0.0155 | 0.0052 |
| 0.0090 | 0.0005 | -0.0155 | 0.0103 |
| 0.0104 | 0.0104 | -0.0155 | 0.0155 |
| 0.0005 | 0.0090 | -0.0103 | -0.0155 |
| -0.0009 | -0.0009 | -0.0103 | -0.0103 |
| -0.0017 | -0.0069 | -0.0103 | -0.0052 |
| -0.0020 | -0.0088 | -0.0103 | 0.0000 |
| -0.0017 | -0.0069 | -0.0103 | 0.0052 |
| -0.0009 | -0.0009 | -0.0103 | 0.0103 |
| 0.0005 | 0.0090 | -0.0103 | 0.0155 |
| -0.0055 | 0.0082 | -0.0052 | -0.0155 |
| -0.0069 | -0.0017 | -0.0052 | -0.0103 |
| -0.0077 | -0.0077 | -0.0052 | -0.0052 |
| -0.0077 | -0.0077 | -0.0052 | 0.0052 |
| -0.0069 | -0.0017 | -0.0052 | 0.0103 |
| -0.0055 | 0.0082 | -0.0052 | 0.0155 |
| -0.0075 | 0.0079 | 0.0000 | -0.0155 |
| -0.0088 | -0.0020 | 0.0000 | -0.0103 |

*FIG. 10-1*

| | | | |
|---|---|---|---|
| -0.0088 | -0.0020 | 0.0000 | 0.0103 |
| -0.0075 | 0.0079 | 0.0000 | 0.0155 |
| -0.0055 | 0.0082 | 0.0052 | -0.0155 |
| -0.0069 | -0.0017 | 0.0052 | -0.0103 |
| -0.0077 | -0.0077 | 0.0052 | -0.0052 |
| -0.0077 | -0.0077 | 0.0052 | 0.0052 |
| -0.0069 | -0.0017 | 0.0052 | 0.0103 |
| -0.0055 | 0.0082 | 0.0052 | 0.0155 |
| 0.0005 | 0.0090 | 0.0103 | -0.0155 |
| -0.0009 | -0.0009 | 0.0103 | -0.0103 |
| -0.0017 | -0.0069 | 0.0103 | -0.0052 |
| -0.0020 | -0.0088 | 0.0103 | 0.0000 |
| -0.0017 | -0.0069 | 0.0103 | 0.0052 |
| -0.0009 | -0.0009 | 0.0103 | 0.0103 |
| 0.0005 | 0.0090 | 0.0103 | 0.0155 |
| 0.0104 | 0.0104 | 0.0155 | -0.0155 |
| 0.0090 | 0.0005 | 0.0155 | -0.0103 |
| 0.0082 | -0.0055 | 0.0155 | -0.0052 |
| 0.0079 | -0.0075 | 0.0155 | 0.0000 |
| 0.0082 | -0.0055 | 0.0155 | 0.0052 |
| 0.0090 | 0.0005 | 0.0155 | 0.0103 |
| 0.0104 | 0.0104 | 0.0155 | 0.0155 |

*FIG. 10-2*

| | | | | | | | | |
|---|---|---|---|---|---|---|---|---|
| | | | | | | | | |
| | | | $(S_2+Y_{11})/2$ | $(S_3+Y_{29})/2$ | $(S_5+Y_{27})/2$ | | | |
| | $(S_4+Y_{23})/2$ | $(S_2+Y_{17})/2$ | $R_1$ | $R_4$ | | | | |
| | | $R_2$ | $R_3$ | | | | | |
| | | $(S_4+Y_{31})/2$ | $R_5$ | $(S_7+Y_{33})/2$ | | | | |
| | | | $(S_8+Y_{39})/2$ | | | | | |
| | | | | | | | | |
| | | | | | | | | |

*FIG. 11*

AUTOMATIC DEFECTIVE DIGITAL MOTION PICTURE PIXEL DETECTION

The present application is a divisional application of U.S. application Ser. No. 14/978,447, filed on Dec. 22, 2015, the full disclosure of which is hereby incorporated herein by reference.

TECHNICAL FIELD

The present invention relates to digital motion picture cameras that capture sequences of digital motion picture frames, and more particularly to the automatic identification of defective pixel sensors within the digital motion picture cameras based upon a filmed sequence of digital motion picture frames.

BACKGROUND ART

Digital camera systems that include sensor arrays (pixel sensors) are generally calibrated before being distributed. During calibration, both dead pixels and stuck pixels are identified and electronic circuits within the camera correct this type of pixel corruption.

Other types of defective pixels are difficult to determine including both hot and cold pixels because the amount of corruption is variable, can be small compared to the signal level, and can depend on the underlying signal. Because of the variation in pixel corruption, hot and cold pixels often go unnoticed during calibration and can lead to enhanced errors due to the use of the hot and cold pixels when different scenes are filmed with different parameters (lighting conditions, colors, intensity, distances etc.).

Additionally during usage, digital cameras that include pixel sensor arrays may suffer as the result of sensor age, sensor deterioration, temperature fluctuations and other environmental conditions. These problems are not normally detected during operation and may only be detected in post processing of the digital motion picture sequence.

In traditional filmmaking—where the camera recorded images on celluloid—the gate was the mechanism in the camera that positioned the film behind the lens as it was exposed to light. Occasionally dirt, lint, dust, hair, and other debris would stick in the gate and interfere with the exposure of the film. The potential damage caused by debris in the gate could render a shot unusable.

Traditional filmmakers developed a protocol to address the problem of debris in the gate, called "Check the Gate". When the director was satisfied with a shot and ready to move to the next shot, the first assistant camera operator would open the camera and examine the gate. If debris or foreign material was found, the camera would be cleaned and the material would be filmed again. If the gate was clean, the director would move on to the next shot.

SUMMARY OF THE EMBODIMENTS

In accordance with one embodiment of the invention, a computer-implemented method for automatically identifying defective pixels captured by a motion picture camera within a sequence of frames is disclosed. The methodology determines if there are defects in the pixel image sensor based on a recorded motion image sequence. An operator can set the threshold for detection of a defective pixel. The threshold can be based upon the severity of the defect as compared to the other color channels at the pixel location and based upon a temporal factor indicative of the amount of motion that occurs at the pixel location within the scene. The threshold may be set lower when accuracy is essential such as in post-production whereas the threshold may be higher during filming where identification of defective pixels may result in replacement of the pixel sensor array by replacing the camera. During filming defects in the pixels are to be expected due to environmental conditions such as temperature and airborne particles. Additionally, during filming, operators recognize that it is unlikely that any one take (sequence of motion picture images) will end up in the final motion picture film.

In one embodiment, the method comprises applying a spatio-temporal metric for each pixel in each frame wherein the spatio-temporal metric weights the spatial severity of error in the pixel by a degree of motion at the pixel to produce a weighted spatio-temporal metric value. The weighted spatio-temporal metric values for each pixel are compared to a threshold to automatically identify defective pixels within the sequence of frames. In general, only one of the color channels will be defective. However, it is possible that all of the color channels are defective when there is a white imbalance.

In an embodiment of the invention, the threshold includes two components a severity threshold and a persistence threshold.

In addition to identification of defective pixels, embodiments of the present invention may also include computer code for repairing pixels that are identified as being defective. Repairs can be made to one or more pixels in one or more frames of the sequence. During analysis of the defective pixels, an operator would expect for a pixel to remain defective over multiple frames and that a pixel may be identified as defective for the entire sequence. It should be noted that a pixel can be considered defective if only one color of the plurality of colors show a defect. Once the frames within the sequence have been repaired, the sequence may be output to a display or stored to memory.

In another embodiment of the invention, the methodology may be implemented differently. In such an embodiment, for each color channel in a frame a spatial error metric for each pixel is calculated by comparing a determined spatial error value of a first color channel with a determined spatial error value of at least a second color channel.

A spatio-temporal metric is then calculated for each pixel wherein the spatio-temporal metric weights the spatial error metric by a degree of motion at the pixel over a plurality of motion picture frames to produce a spatio-temporal metric value. Once each of the frames in the sequence had been processed, the spatio-temporal metric values are compared to a threshold to determine if spatio-temporal metric value exceeds the threshold and if the spatio-temporal value exceeds the threshold identifying the corresponding pixel as defective. Embodiments of the invention may also extract each color channel from the motion picture frame and store each color channel in associated memory. Embodiments of the invention may also include determining a value characterizing motion for each pixel within each frame of the sequence. The spatial error value may be determined for each color channel by applying a spatial filter to determine a difference between an observed pixel value and a predicted pixel value. A temporal filter may be applied to the data within the sequence of frames. For example, a temporal filter may be applied to determine a value characterizing motion over a set of frames that determines an amount of relative motion at a pixel location over the set of frames. For each pixel, a spatial error value may also be calculated for each color channel by comparing an expected spatial value to the actual spatial value for each pixel. In certain embodiments, the spatial error metric is determined by comparing all of the color channels.

The spatio-temporal metric in certain embodiments of the invention can be represented as a combination of the spatial metric and a temporal filter.

In embodiments of the invention, a score for each pixel identified as being defective can be determined. The score can be then be used by the digital motion picture processor for identifying a maximum score at each pixel and identifying the motion picture frame associated with the maximum score. By identifying the maximum score for each defective pixel, an operator can review the frame having the greatest defect and can judge whether the defect is significant enough to warrant further processing and repair without needing to review the entire sequence of frames.

The digital motion image processor may present on a graphical user interface a listing of all of the detected defective pixels for review by an operator. The defective pixel may be identified on the graphical user interfaces as being lighter or darker than expected.

In certain embodiments, the digital motion image processor may present to an operator on a graphical user interface an identification of the frame associated with the pixel having the highest score. The graphical user interface may also provide for user selection by the operator for selecting the frame associated with the pixel having the highest score and in response to selection of the frame graphically presenting the frame to the user for visual review.

In addition, the graphical user interface may provide for selection of one or more defective pixels and in response to selection of one or more pixels automatically correcting the one or more defective pixels using a spatial filter algorithm and pixels proximate to the defective pixel.

In another embodiment of the invention, a sensor array may be checked to determine if a sequence of frames meets with the visual inspection of an operator, re-filming of the sequence needs to be performed due to the defective pixels within the sequence or if the digital motion picture camera used to film the sequence should be replaced with a new digital motion picture camera. First, a digital motion picture processor receives a sequence of motion picture frames of pixel data to be analyzed. The digital motion picture processor creates a spatio-temporal representation of the pixel data and analyzes the spatio-temporal representation of the pixel data to determine if the representation exceeds a threshold.

The digital motion picture processor displays for evaluation by the operator one or more selected frames of pixel data that have an associated spatio-temporal representation that exceeds the threshold indicating that there is at least one defective pixel within the frame. The operator is provided with a graphical display allowing the operator to select to either repair and store the sequence of motion picture frames of pixel data or just store the sequence of motion picture frames of pixel data to memory.

In addition to the disclosed methodology, the methodology may be embodied in computer code on a computer readable medium as a computer program product. Additionally, the methodology may be embodied as a system, wherein the system includes a digital motion image processor and modules for analyzing spatial and temporal properties of a digital motion image sequence of frames to identify defective pixels within the sequence and an additional module that allows for repair of pixels that have been identified as being defective.

BRIEF DESCRIPTION OF THE DRAWINGS

The foregoing features of embodiments will be more readily understood by reference to the following detailed description, taken with reference to the accompanying drawings, in which:

FIG. 4 shows an exemplary convolution kernel of size 15×15 that can be used for noise reduction in spatial and temporal filtering;

FIG. 7 (7-1, 7-2) shows a 44×6 matrix based on the matrix in FIG. 6B.

FIG. 8 is a 5×6 matrix that represents the 5 central pixels to be repaired.

FIG. 9A is an 8×6 matrix that represents the 8 pixels surrounding the repair region. The pixels in the matrix seamlessly blend the repair into the background.

FIG. 9B is the 7×7 region surrounding the pixel of interest.

FIG. 10 (10-1, 10-2) shows an exemplary transpose of Z.

FIG. 11 shows an exemplary local portion of a frame of data with pixels being repaired and blended to correct for a defective pixel.

DETAILED DESCRIPTION OF SPECIFIC EMBODIMENTS

Definitions. As used in this description and the accompanying claims, the following terms shall have the meanings indicated, unless the context otherwise requires:

The term "scene" shall refer to a sequence of consecutive motion picture frames. A scene is generally thought of as the action in a single location and continuous time. Thus, a scene refers to a set sequence and continuity of observation.

The term "dead pixel" refers to a pixel in an array of pixel sensors for a digital motion picture camera that does not record a signal. An image with a dead pixel appears dark at the location of the dead pixel.

The term "stuck pixel" refers to a saturated pixel in an array of pixel sensors. The pixel records a saturated signal and the resulting image appears extremely bright at the location associated with the pixel sensor.

The term "hot pixel" refers to a pixel sensor that records a signal that is elevated compared to a normal pixel. The resulting image includes a pixel value that appears brighter than expected at the image location associated with the" hot pixel" sensor.

The term "cold pixel" refers to a pixel sensor that records a signal that is depressed compared to a normal pixel. The resulting image includes a pixel value that appears darker than expected at image location associated with the "cold pixel" sensor.

The term "defective pixel" shall mean any type of pixel corruption including stuck pixels, dead pixels, hot pixels and cold pixels. It should be noted that hot and cold pixels can manifest themselves as the result of environmental factors, such as temperature and sensor age. Additionally, environmental factors can degrade calibration that is done by the manufacturer prior to selling the digital motion picture camera. Pixels may become defective at any time for a variety of reasons: temperature, physical damage, electromagnetic interference, sensor age. The term "spatio-temporal metric" refers to a measurement of a spatial error at a pixel location that is weighted by the amount of motion at the pixel location over a series of motion picture frames. Thus, when pixels are evaluated and compared to a threshold, pixels that have a high spatial error will be flagged as begin defective. Additionally, pixels with a lower spatial error may also be flagged as a defective pixel if motion occurs at that pixel in a digital motion picture sequence. Thus, the spatio-temporal metric measures whether there is a defect in the pixel sensor of the filming camera, but errors are also impacted by the content being filmed. A pixel may be considered defective for a first digital motion picture scene and may not be considered to be defective for a second digital motion picture scene even though the physical hardware at the pixel sensor is experiencing a defect in resolving the image due to the pixel experiencing motion in the first digital motion picture scene and no motion in the second digital motion picture scene.

Figure 1:
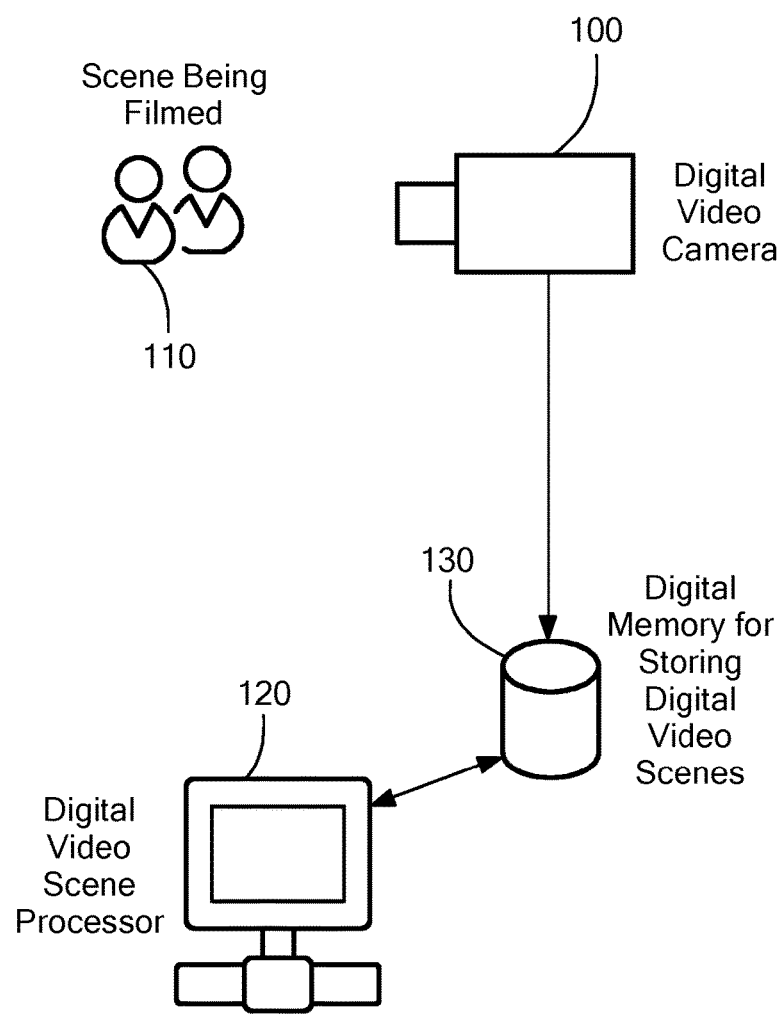
FIG. 1 is an exemplary flow chart explaining the methodology for processing a digital motion picture scene while on location to determine if there are any defective pixels that require the scene to be re-filmed.

As shown in FIG. 1, embodiments of the invention process digital motion picture frames captured using a digital motion picture camera 100 of a scene being filmed 110. The digital motion picture camera has a sensor array wherein a location within the sensor array defines a pixel. After a filmmaker has captured a scene of digital motion picture and the digital motion picture scene is stored in memory 130, the digital motion picture is provided to a digital motion picture processor 120 for checking to digital motion image sequence to identify any defective pixels within sensor array and determining if one or more of the digital motion picture cameras needs to be replaced before moving on to film another scene. It is presumed that if a pixel is identified as being defective, the pixel will remain defective for the entire motion picture sequence, since the defect is related to the sensor array for the pixel. Problems that can affect the sensory array during filming include temperature variations, overheating, and other influences. The digital motion picture processor may be configured to score frames of motion picture and compare each frame to a threshold score. Thus, a scene may have one or more frames of motion picture with defective pixels; however, the defects may not rise to the level that the entire motion picture sequence needs to be re-filmed. In the alternative, if the defects in the pixels in one or more frames exceeds a threshold value, the frames will be marked and then provided to an operator to review the marked frames to determine if the scene needs to be filmed again or if the pixels need to undergo a correction process. It should be understood that the system can keep track of the number of defective pixels in each motion picture frame, the severity of defect for each pixel, and can identify individual motion picture frames within the sequence where the defective pixels have the greatest scores. Thus, an operator can be directed to the frames in the motion picture sequence where the defects are most objectionable. The operator would not need to review all of the frames in the motion picture sequence if the operator determines that the worst frames are of satisfactory quality.

Figure 1A:
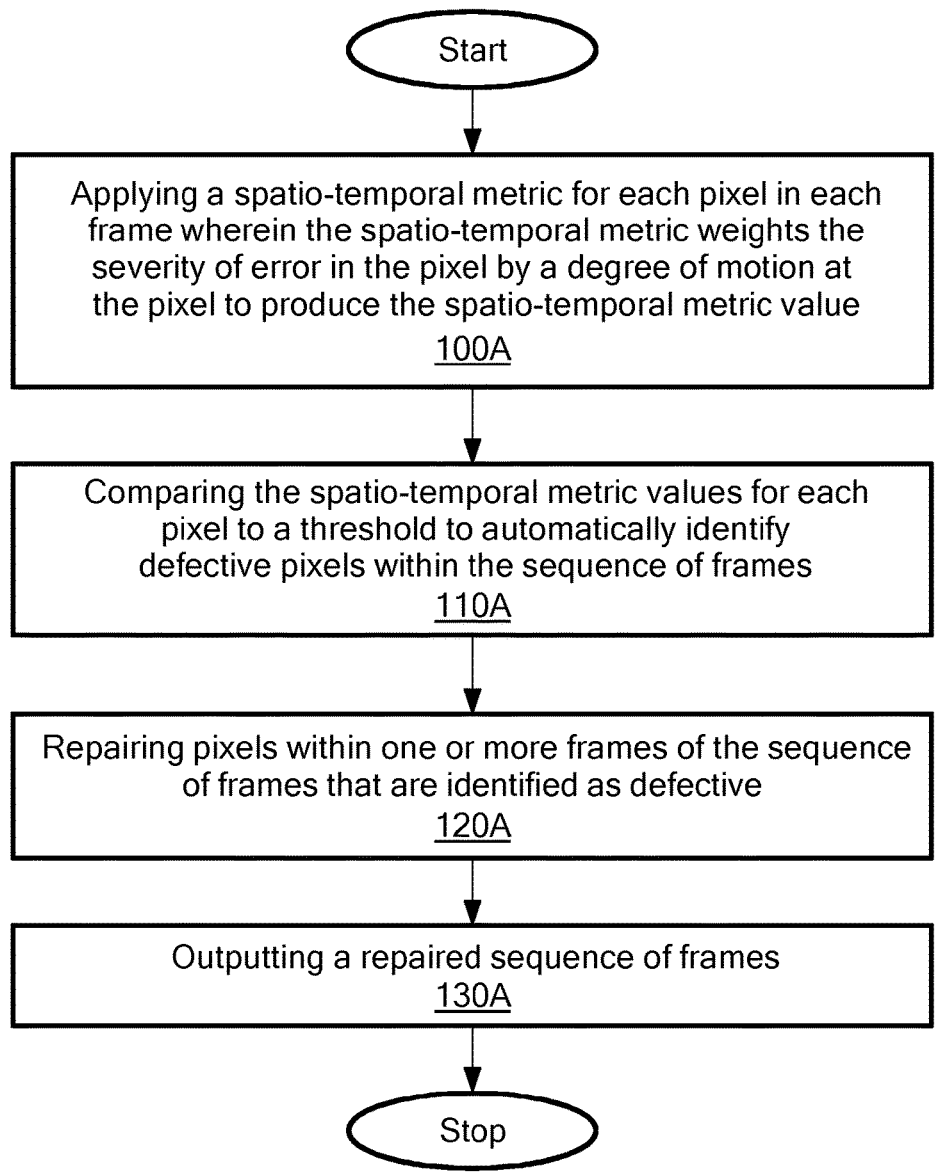
FIG. 1A is a flow chart explaining the process of applying a spatio-temporal metric for each pixel with a sequence of motion picture frames to automatically identify defective pixels and provide an operator with a chance to review frames within the sequence and decide if the defective pixels need to undergo a repair process.

FIG. 1A is a flow chart explaining the process of applying a spatio-temporal metric for each pixel with a sequence of motion picture frames to automatically identify defective pixels and provide an operator with a chance to review frames within the sequence and decide if the defective pixels need to undergo a repair process. The digital motion picture sequence is retrieved from memory and provided to the motion picture processor. The processor performs some basic tasks, such as identifying the digital motion picture frames and processing them individually. Once the frames are parsed and identified by a parser within the digital motion picture processor, the digital motion picture processor applies a spatio-temporal metric for each pixel in each frame wherein the spatio-temporal metric weights the severity of error in the pixel by a degree of motion at the pixel to produce the spatio-temporal metric value 100A. It should be recognized that a the spatio-temporal metric takes into account both the intensity of spatial differences of pixels based upon the associated color values for the pixels and also by determining a motion measurement, for example, the luminance at a pixel location over a series of pixels which can identify that motion occurs at the pixel. This process is done for each frame of video in the motion picture sequence. The frames are then compared to one or more threshold values. The digital motion picture processor compares the spatio-temporal metric values for each pixel to a threshold to automatically identify defective pixels within the sequence of frames 110A. The threshold value may be based on one or more components such as severity of error and persistence of the error over the sequence of frames. It should be clear that depending on the application of an embodiment of the invention, the threshold values can be set to different levels. If the motion picture processor is being used on set to determine if a reshoot is necessary, the threshold may be lower than if the digital motion picture processor is used during an editing phase. During shooting, an operator recognizes that the majority of footage will not make the final cut and therefore, defects may be present in the sequence of frames, so long as they are not severe. The main concern of the operator is whether the camera needs to be replaced because there are severe defects that are persistent throughout the sequence. On the other hand, if the sequence is being used during the editing process and will be part of the final motion picture, the threshold can be set lower. Thus, any perceptible error could be identified and undergo repair. If the operator determines that there are defective pixels that need to undergo repair, the operator can instruct the motion picture processor to automatically repair the pixels. The motion picture processor will then repair pixels within one or more frames of the sequence of frames that are identified as defective 120A. After the pixels are repair, the digital motion picture processor will output the repaired sequence of frames to a video display so that the operator can review the repairs and confirm that the sequence of frames meet with his approval and can be edited into the motion picture 130A.

Figure 2:
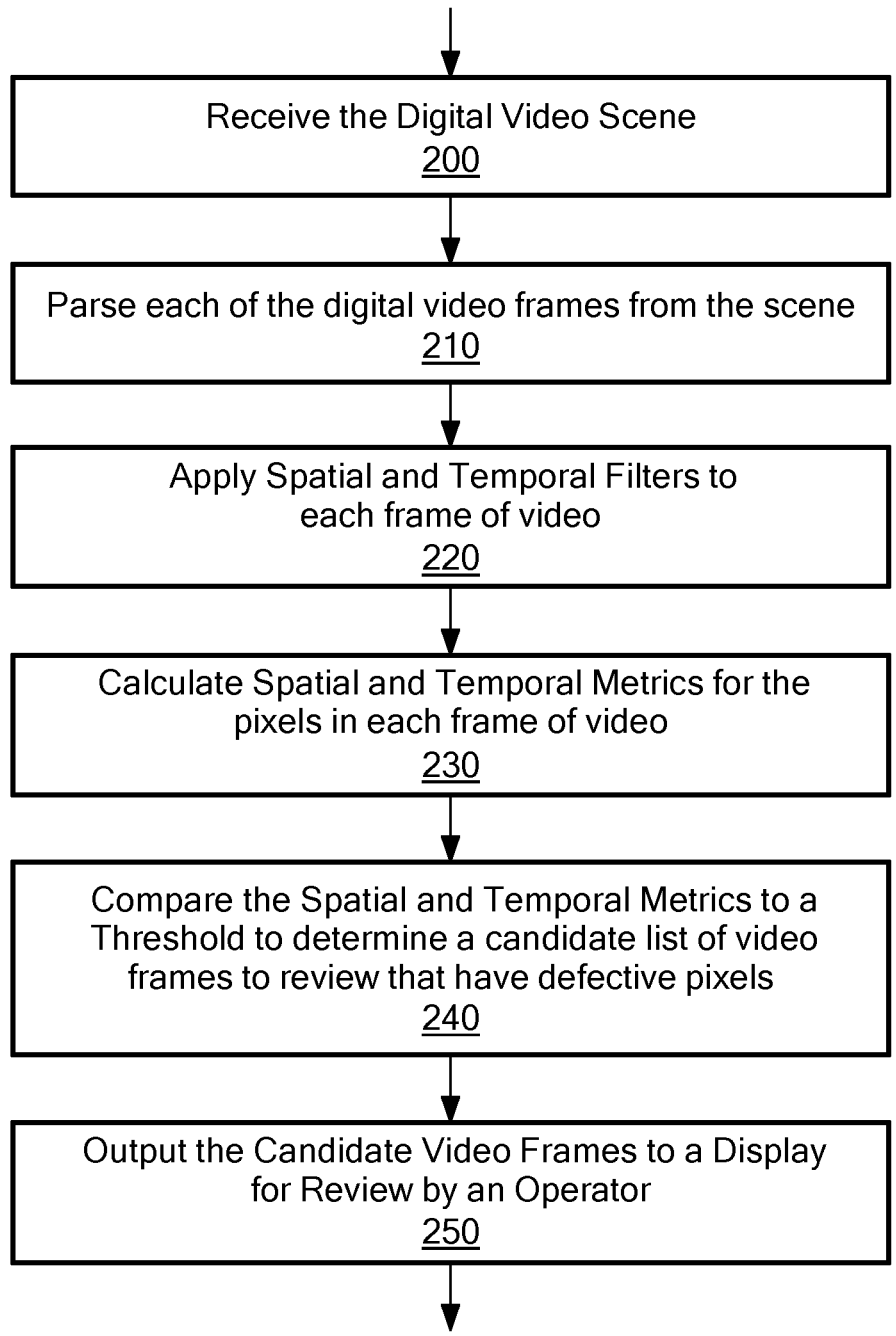
FIG. 2 is an exemplary flow chart explaining the methodology for processing a digital motion picture scene to determine if there are any defective pixels that require the scene to be re-filmed or for the scene to undergo further processing to correct any error in the digital motion picture scene.

FIG. 2 is an exemplary flow chart explaining the methodology for processing a digital motion picture scene to determine if there are any defective pixels that require the scene to be re-filmed or for the scene to undergo further processing to correct any error in the digital motion picture scene. It should be understood that embodiments of the present invention may be used during the filming of scenes in the field or may be employed during the editing process. First, the digital motion picture scene is received by a digital motion picture processor. 200 The digital motion picture scene is input into memory and the digital motion picture scene is parsed by the digital motion picture processor by frame. 210 Each frame of digital motion picture is then analyzed to determine if the digital motion picture frame contains one or more pixels that are defective by employing both spatial and temporal filters. 220 Spatial and temporal metrics for the pixels within the frames are calculated. 230 The spatial and temporal metrics are determined for each frame of motion picture and the after the sequence is completed, the spatial and temporal metrics are scored and compared to one another to determine a list of candidate motion picture frames to review 240. The candidate motion picture frames are the motion picture frames that have defective pixels. The candidate frames may have a high number of defective pixels, may have defective pixels located within a specific spatial region, or may show an extreme difference over time (e.g. between motion picture frames). The candidate list of frames can be compared to threshold values for one or more of the spatial and temporal metrics. If the frames fall below the threshold values, the frames will be considered to be "good enough" and do not need any further evaluation. Thus, this methodology can eliminate the need for professional review of the motion picture frames. If one or more of the candidate motion picture frames have one or more determined metrics that are above a threshold, then these motion picture frames can be output to motion picture display for review by an operator 250. The operator can then determine whether or not the motion picture scene needs to be re-filmed or if filming can be continued where a new scene is filmed.

Figure 2A:
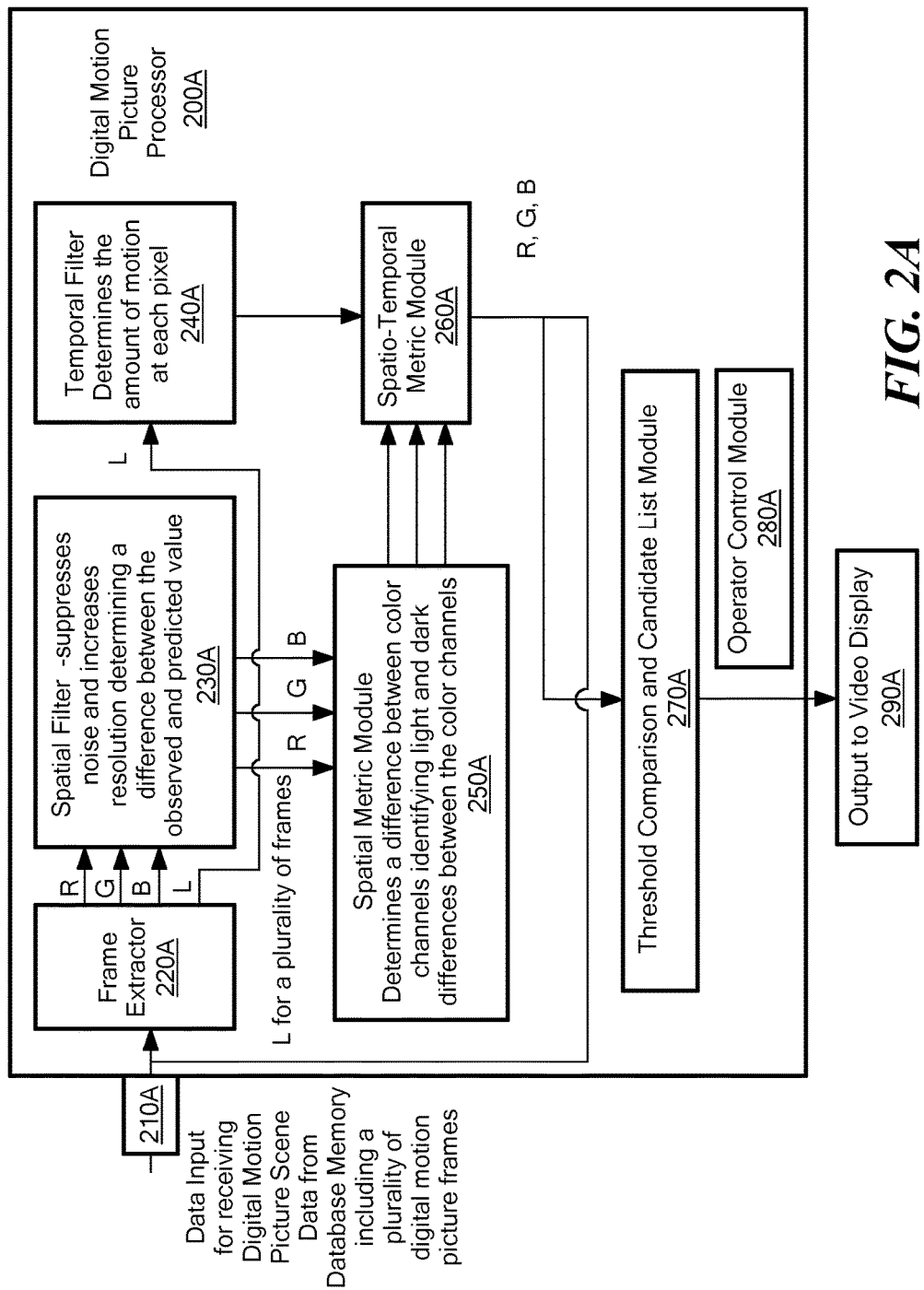
FIG. 2A shows an embodiment of the digital motion picture processor and the various modules that contribute to determining if a pixel is defective.

FIG. 2A shows an embodiment of the digital motion picture processor 200A. The digital motion picture processor includes a data input 210A. The data input receives from memory the digital motion picture scene data. The data is buffered in memory and a frame extractor 220A extracts each frame of video in accordance with the protocol in which the motion picture sequence is stored (e.g. MPEG, MPEG4, ISO/IEC 15444-1 "JPEG2000", etc.) The color channels of each frame are parsed and passed to a spatial filter 230A while a representation of motion (e.g. luminance, the Green channel in isolation or a combination of Red, Green, and Blue channels in combination for motion analysis) are directed to a temporal filter 240A. The frame extractor can buffer a number of frames (e.g. 4, 6, 10, 20 etc.) wherein only the color channels for a single frame are passed to the spatial filter during a time period. The motion information for a plurality of frames is passed to a temporal filter 240A. The spatial filter module 230A applies spatial filters to each of the individual color channels and outputs a spatial filter value for each pixel within the frame that suppresses the noise. The resulting spatial filter color channel values are forwarded to a spatial metric module 250A. The spatial metric module 250A determines a difference between the filtered color channel values. By comparing the differences between the colors for a pixel, the spatial metric module 250A measures the degree of defect wherein positive and negative differences are indicative of light and dark variations in a color. The temporal filter module 240A uses the motion characteristic data such as the luminance to determine if there is motion at each pixel by comparing the motion characteristic data over a plurality of frames that are proximate to the frame under consideration. The output array of motion information for each pixel is provided to the spatio-temporal metric module 260A. The spatio-temporal metric module 260A receives in the spatial metric values for each color channel of a frame along with the temporal filter data for each pixel within the frame. In one embodiment of the invention, the spatio-temporal module associates the values together and the values are passed on through to the threshold comparison and candidate list module 270A. In another embodiment of the invention, the spatio-temporal module weighs the spatial metric values at each pixel by the temporal filter values to determine the spatio-temporal metric values for each pixel in the frame. The frame data is then passed to a threshold comparison and candidate list module 270A. In one embodiment, the spatio-temporal metric values are stored for each frame of video and then compared to a threshold. In other embodiments of the invention, a quantile system is developed that stores values for a single frame and keeps track of the errors in color in terms of both persistence (e.g. number of frames) and severity (e.g. 70% quantile etc.). A list of candidate pixels is determined by comparing to a threshold that may either be predefined or operator defined. The threshold may be set for both persistence and severity or a weighted version of persistence and severity. If the spatio-temporal metric value for a pixel exceeds the threshold, the pixel is identified as defective. The module 270A may also keep track of the frame containing the defective pixel and may increment a counter to determine the number of frames for which the pixel is defective. In conjunction with an operator control module 280A that allows an operator to have the data output to a video display indicating where the errors are located by pixel location, in the number of frames, and the frame exhibiting the greatest severity. The operator control module 280A allows the operator to access the frame data and view the frame data to observe the defective pixels. Thus, the operator control module 280A provides for operator control of the digital motion picture processor and provides a graphical user interface to the operator. The operator control module 280A causes the threshold comparison and candidate list module 270A to populate a graphical user interface and outputs the graphical user interface with the representative data for the defective pixels to on output 290A. Additionally, the operator control module 280A can access the original images (frames) from memory and have them displayed through the output to a video display for review and further processing by the operator. The operator control module 280A may also have access to other modules such as a repair module that can be used for repairing defective pixel data. An example of a repair of defective pixels is explained below.

Figure 3:
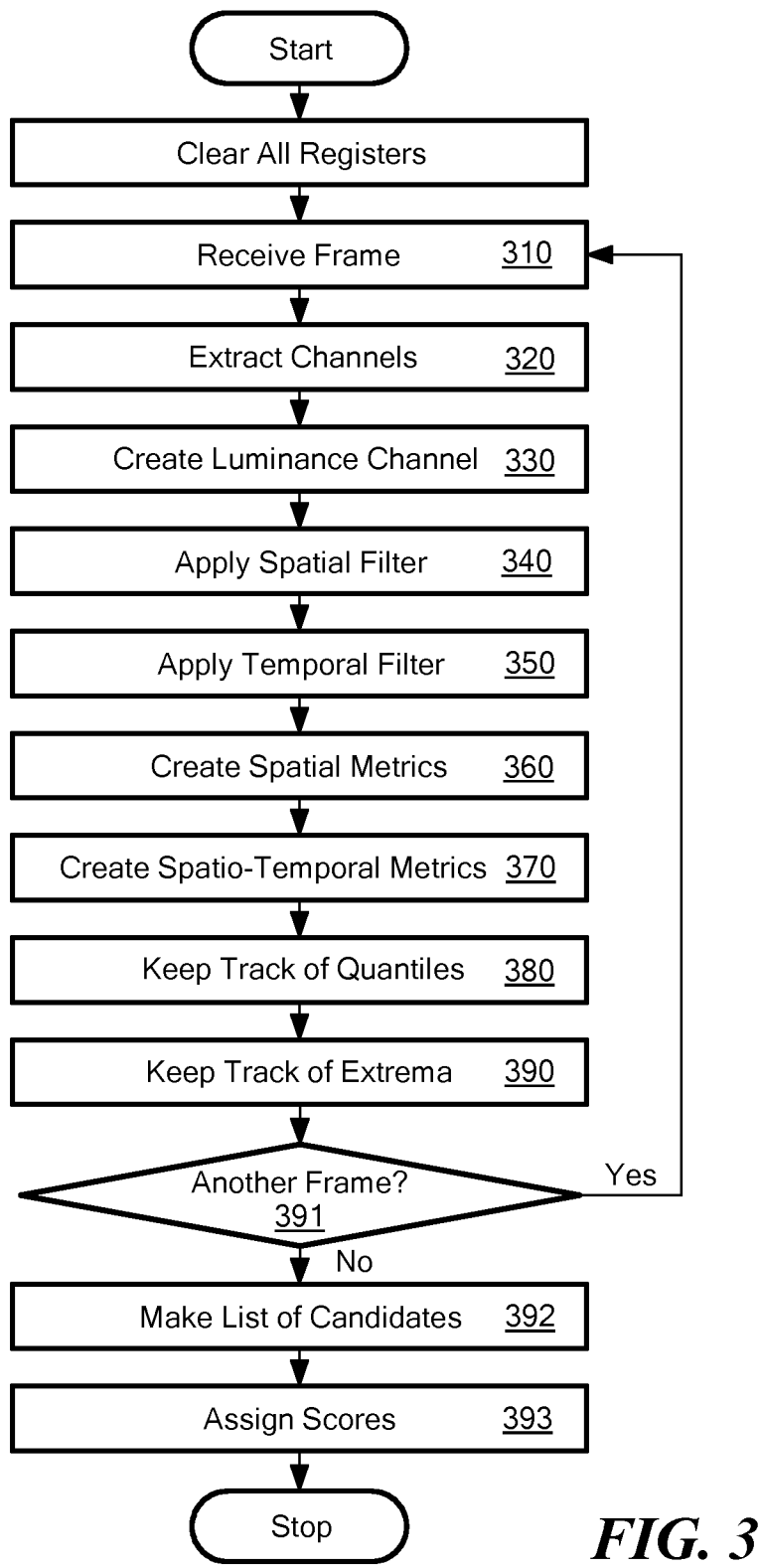
FIG. 3 is a more comprehensive version of the previous flowcharts showing the methodology for determining if a digital motion picture scene includes defective pixels including determining spatial metrics, temporal metrics, quantile and extrema determinations.

FIG. 3 is a more comprehensive version of the flowchart of FIG. 2 showing the methodology for determining if a digital motion picture scene includes defective pixels including determining spatial metrics, temporal metrics, quantile and extrema determinations. In a first step, the digital motion picture processor clears all registers 300. The registers store data for each color channel, the spatial filter data for each color channel, the temporal filter data for each color channel, the spatial and temporal metrics for each color channel and may also store intermediary calculations. The digital motion picture scene is first provided to a digital motion picture processor after being captured during a digital motion picture shoot for a scene. As noted, the digital motion picture processor includes a plurality of registers for storing calculations. In the case of original camera footage, the entire recorded sequence of the scene is processed. In the case of edited material, an entire edited sequence is processed.

Each frame is first processed individually. The digital motion picture processor receives as input the first digital motion picture frame parsed from the digital motion picture sequence 310. The individual color channels are extracted from the frame (e.g. R,G,B etc.) 320. If the camera does not use Bayer-type pattern encoding or if the frame has already been debayered, the color channels will be of equal size with the same horizontal and vertical dimension. If the digital motion picture camera produces frames in a Bayer encoded forms, the color channels will be of different horizontal and vertical dimension when received. Typically, the green channel is twice as large as the red and blue channels in the case of Bayered data. For simplicity in operation, the methodology extracts the channels from the frame and converts them to an equal size if necessary. It should be recognized that the methodology may also operate on Bayered data or other digital motion picture data wherein not all of the channels are of equal size, however the calculations would be more complex. When the data is extracted from the color channels, a nearest neighbor algorithm can be used to convert from a lower resolution to a higher resolution. Other known conversion algorithms may also be employed without deviating from the scope of the invention. During extraction, three sets of data are obtained. For example:

$\{R_i\}$, $\{G_i\}$, $\{B_i\}$ where i indexes the pixels in the largest channel or each channel for a frame may be referenced as R,G,B using bold-faced letters. The subscript "i" indicates pixels within a frame.

If a luminance channel does not already exist, a luminance channel is created 330. Preferably, the luminance channel has a dimension that is equal to the largest color channel. The luminance channel is used to measure motion at each pixel and can be used to detect black and/or white pixel damage. For example to measure motion, the temporal metric is computed and to detect black and/or white pixel damage, the spatial metric on the luminance channel is calculated.

The equation of the luminance channel is $Y_i = 0.2*R_i + 0.7*G_i + 0.1*B_i$

This yields an array of values:

$Y = \{Y_i\}$ where i indexes the pixels in the largest channel. In digital cameras, it is common for the Red and Blue channels to be recorded at half the resolution of the Green channel. A "4K" camera might have a horizontal resolution of 1024 pixels for the Red channel, 2048 pixels for the Green channel, and 1024 pixels for the Blue channel. Added together, the resolution of the camera is 4096. The largest channel in this case would be the Green channel. It is equally common for electronics within the camera to deliver three channels of equal resolution. Embodiments of the present methodology for defective pixel detection are designed to work when the color channels have mixed resolution. It is also designed to work when the color channels have equal resolution.

For each color channel of the frame as defined by C, including the luminance channel, a sequence of spatial image filters are applied 340. A convolution kernel A is used to predict the value of the central pixel based on its spatial neighbors. For example, the convolution kernel shown in FIG. 4 is an exemplary convolution kernel of size 15×15. This filter is applied to each pixel of the image within each color channel. Filters besides the one in FIG. 4 may be applied that predict the central value based on spatial neighbors in the image and such filters may be of different sizes. Embodiments of the invention may use a constant predictive model or other alternative predictive models including linear and non-linear filters.

As shown in FIG. 4 if all of the values in A are divided by 10,000, the kernel values would sum to 1.0. Any filter that creates a reliable prediction of the central pixel would be suitable to employ. The present circular filter is used since it treats pixels in all directions equally. Using a kernel which sums to 1 guarantees unity gain so subsequent computations are within a known range. Non-unity gains could be accommodated with corresponding adjustment to the range of subsequent computations.

The set of spatial filters are calculated for each color channel wherein C is the color data for all of the pixels within a motion picture frame. Preferably, the values of Z are calculated in order, however some of the calculations may be performed in parallel or out of order. It should be clearly noted that $Z_1$ through $Z_9$ below are calculated for each color channel (e.g. R,G, B, and Y) for each motion picture frame.

| Filter definition | Filter description |
|---|---|
| $Z_1 = C * A$ | the convolution of the channel image, C, and the kernel, A |
| $Z_2 = C \times C$ | the channel values, squared pixel-by-pixel |
| $Z_3 = Z_2 * A$ | the convolution of $Z_2$ and A |
| $Z_4 = Z_1 \times Z_1$ | the $Z_1$ values, squared pixel-by-pixel |
| $Z_5 = Z_3 - Z_4$ | the pixel-by-pixel difference between $Z_3$ and $Z_4$ |
| $Z_6 = \max(Z_5, 0.000001)$ | the pixel-by-pixel maximum of the pixel value and a constant |
| $Z_7 = \mathrm{sqrt}(Z_6)$ | the pixel-by-pixel square root of $Z_6$ |
| $Z8 = C - Z_1$ | The pixel-by-pixel difference between C and $Z_1$ |
| $Z9 = \mathrm{abs}(Z_8/Z_7)$ | the absolute pixel-by-pixel ration of $Z_8$ to $Z_7$ |

At each pixel, we assign the larger of $Z_5$ and 0 to $Z_6$ to prevent a divide-by-zero error when computing $Z_9$. At each pixel, $Z_1$ is the average value within a small region surrounding that pixel. $Z_3$ is the average squared value within the region. $Z_5$ is the variance of the pixel values within the region. $Z_9$ is the number of standard deviations the central pixel deviates from its predicted value. $Z_9$ indicates with statistical confidence how much any pixel deviates from its predicted values. Stated differently, $Z_9$ is a good indication of how defective any pixel is. It should be recognized that other predictive models may be employed without deviating from the intended scope of the invention and the calculations presented above in the table would be adjusted to reflect the nature of the model.

After applying this sequence of filters in order to each channel, the following arrays are created:

$R^S = \{R^S_i\}$, $G^S = \{G^S_i\}$, $B^S = \{B^S_i\}$, and $Y^S = \{Y^S_i\}$

Each array results from applying the sequence of filters to the appropriate channel. The superscript S is used to be indicative of the spatial filter calculations. The output of the spatial filters $Z_9$ represents a comparison between the actual color value and the predicted color value at the pixel. $Z_9$ is the difference between the observed pixel value C and the predicted value $Z_1$, then weighted by the standard deviation. In other words, $Z_9$ is the number of standard deviations a pixel deviates from its predicted value.

A temporal filter is then applied to the luminance channel 350. The difference between the current frame and other temporally local frames are determined. Often the other frames will be the previous and next frames in the sequence, but can be any collection of frames. A smoothing kernel is used of a sufficient size to suppress noise. Any kernel that will suppress noise such as a low pass filter and that is of an adequate size can be used and applied to the luminance channel. For example, the kernel as shown in FIG. 4 can be used. The kernel will be referenced by the bolded letter A. (Note: it is just a coincidence that we use the same kernel in previous step. In this step, A is used to smooth the signal and reduce the effects of inter-frame camera noise. In the previous step, A is used to predict the central pixel value from surrounding intra-frame pixels.) Other low pass filters could also be used. A sequence of filters using the luminance channel is then applied.

| Filter definition | Filter description |
|---|---|
| $Z_1 = Y$ | the luminance values of the current frame |
| $Z_2 = Y$ | the luminance values of the previous frame |
| $Z_3 = Y$ | the luminance values of the next frame |
| $Z_4 = \text{abs}(Z_1 - Z_2)$ | the pixel-by-pixel absolute difference between $Z_1$ and $Z_2$ |
| $Z_5 = \text{abs}(Z_1 - Z_3)$ | the pixel-by-pixel absolute difference between $Z_1$ and $Z_3$ |
| $Z_6 = Z_4 * A$ | the convolution of $Z_4$ and the kernel A |
| $Z_7 = Z_5 * A$ | the convolution of $Z_5$ and the kernel A |
| $Z_8 = \max(Z_6, Z_7)$ | the pixel-by-pixel maximum of $Z_6$ and $Z_7$ |

After applying this sequence of filters in order to each channel, the following array is created:

$Y^T = \{Y^T_i\}$

The array results from applying the sequence of filters to the luminance channel. The superscript T is used to be indicative of the temporal filter calculations. The bigger the values that result in this calculation of the luminance channel the more motion that is present at that pixel.

Spatial metrics are then determined for each pixel within a frame. 360 For detecting defects in each color channel, the spatial metric for a channel is calculated an image of differences: the spatial filter of the channel under consideration, less a combination of the spatial filters of the other two channels. When detecting defects in all channels, the spatial metric is a combination of the individual channel spatial filters.

In most cases, there will be three spatial metric images. A fourth spatial metric image will be computed when defects in all three-color channels are anticipated. The spatial metric values shall be positive and negative corresponding to bright and dark defects.

For each color channel filter generated in in spatial filter processing step 140A, the following calculations are applied. Please note that the letters "C","E", and "F" each represent different color channels and the super script "S" represents that the image data is from the spatially filtered data sets:

| Metric definition | Metric description |
|---|---|
| $Z_1 = \text{abs}(C^S)$ | the pixel-by-pixel absolute value of the color channel generated in determining the spatial filter values |
| $Z_2 = \text{sign}(C^S)$ | the pixel-by-pixel sign, −1 or +1, of the channel |
| $Z_3 = \text{abs}(E^S)$ | the pixel-by-pixel absolute value of a second color channel generated in determining the spatial filter values |
| $Z_4 = \text{abs}(F^S)$ | the pixel-by-pixel absolute value of the third color channe lgenerated in determining the spatial filter values |
| $Z_5 = \max(Z_3, Z_4)$ | the pixel-by-pixel maximum of between $Z_3$ and $Z_4$ |
| $Z_6 = Z_1 - Z_5$ | the pixel-by-pixel difference between $Z_1$ and $Z_5$ |
| $Z_7 = Z_2 \times Z_6$ | the pixel-by-pixel product of $Z_2$ and $Z_6$ |

After applying this sequence of steps in order to each channel, the following arrays are created:

$R^{SM} = \{R^{SM}\}$, $G^{SM} = \{G^{SM}\}$, $B^{SM} = \{B^{SM}\}$ where the super script SM is indicative of a spatial metric.

The spatial metric for the luminance channel is simply:

$Y^{SM} = Y^S$

The values of $Z_7$ provides an image modified metric for a single color channel (e.g. red) as compared to the other color channels (e.g. green, blue) Thus, as expressed above there are spatial metrics for each of the color channels. The metrics are either positive or negative representing whether the color channel is light or dark in comparison to the other color channels.

For each spatial metric image, a spatio-temporal metric image is created with matching resolution 370. The spatio-temporal metric image is a combination of the spatial metric image and the temporal filter image. The combination can take the form of the spatial metric image less a weighted temporal filter image. Additionally, the combination can be the scaled spatial metric image relative to the temporal filter image. It should be obvious to one of ordinary skill in the art that other combinations of the spatial and temporal filter and metric data can be combined together to define a temporal metric that represents both the severity of the defect and the persistence of the defect over a plurality of frames.

Figure 5:
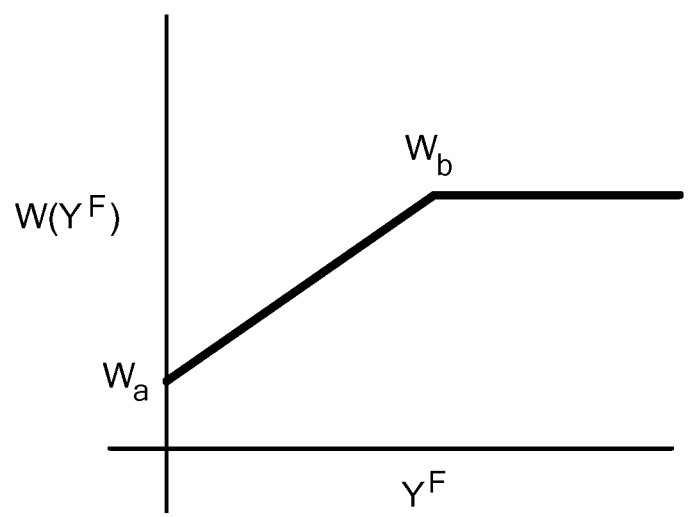
FIG. 5 show an exemplary weighting curve representative of W for weighting the temporal filter image data.

FIG. 5 show an exemplary weighting curve representative of W that is used for the calculation of $Z_1$ in the table below. The function W is a weighting of the temporal filter image. The weighting function passes through the points wa and wb. For example these values may default to wa=(0, 0.1) and wb=(0.05, 1). That is W(0)=0.1 and W(0.05)=1, with linear interpolation between these two points. It should be understood by one of ordinary skill in the art that other weighting functions may be applied having different shapes and passing through different points.

For each color channel and the luminance channel, the following method steps are applied to determine the temporal metrics in one embodiment of the invention.

| Metric definition | Metric description |
|---|---|
| $Z_1 = W(Y^{TF})$ | the function W, depicted in FIG. 5, applied to each pixel of the temporal filter image |
| $Z_2 = C^{SF} \times Z_1$ | the pixel-by-pixel product of the color channel of the calculated spatial filter |
| $Z_3 = \max(\min(Z_2, t), -t)$ | clip the values of $Z_2$ to the range [−t, t]. t may for example be .1 |
| $Z_4 = Z_3/t$ | normalize the metric to the range [−1, 1] |

After applying this sequence of steps in order to each channel, the following arrays are created:

$R^{TM} = \{R^{TM}_i\}$, $G^{TM} = \{G^{TM}_i\}$, $B^{TM} = \{B^{TM}_i\}$, $Y^{TM} = \{Y^{TM}_i\}$ where the superscript TM represents the temporal metric This methodology takes the raw magnitude of motion and rescales the motion to determine if the temporal errors reach a threshold where an ordinary observer would be capable of perceiving errors in pixels over time. For typical motion picture, if there is little motion happening within the frame defects can be hard to spot, however if there is more motion, the defects become more pronounced and are perceptible. The generated images assume values between −1 and 1. The temporal metric may be set to represent statistical significance of the defect. For, example the temporal metric may represent the number of standard deviations from a median value. By assuming values between −1 and 1, negative values represent dark pixel values whereas positive values represent bright pixel values.

Typically, a defect will occur in only a single color channel as the result of a defect in one of the color sensors for a pixel. The methodology expects that the defect for a pixel should be across frames and consistent. A comparison can then be made between frames to determine if the error is a consistent error. As indicated above, errors that occur across multiple color sensors for a pixel, generally reflect white defects.

In one embodiment of the invention, the temporal metric image is made discrete by dividing an image into quantiles for each color channel including luminance. 380. Quantization is chosen in order to avoid the need to store all of the metric data for each image in the motion picture sequence. For example, there may be 100s or 1000s of frames of data requiring an enormous amount of memory if all of the various array values are to be stored. Rather to conserve memory, for each quantile of image data and for each color channel, a set of registers is assigned. It should be recognized by one of ordinary skill in the art that quantization is an optional component and may or may not be employed in embodiments of the invention. Quantization as described herein provides an efficient method for reducing the memory requirements of the above described calculations such that the data is presented for a single image (which is representative of all of the pixels of the camera sensor) and accumulated over the sequence of images rather than storing the state for each image within the sequence.

As stated above, the generated temporal metric images assume values between −1 and 1. The number of quantiles is $Q=(2 \times N+1)$, where N is as large as possible (e.g. 5, 10, 20 etc.). The quantile algorithm resets all registers associated with the quantile calculations to zero. Then in one embodiment of the invention, for each new image the quantile registers are aggregated according to the following operations:

| Quantile definition | Quantile description |
| --- | --- |
| $Z_1 = \text{round}(N \times C^{TM})$ | the channel $C^{TM}$ is generated by the temporal metric. The resulting values $Z_1$ |
| for each value $q = -N$ to $+N$ | iterate through all the quantile values, q |
| $Z_2 = \text{indicator}(Z_1 = q)$ | the indicator function returns 1 if $Z_1$ is equal to q and 0 if $Z_1$ is not equal to q |
| $C^T[q] = C^T[q] + Z_2$ | accumulate the number of times each pixel has quantile value q |
| end of for loop | iterate the loop for the next value of q |

After applying this sequence of steps in order to each channel, the following arrays are created for each quantile:
$R^{TMq} = \{R^{TM}_i\}^q$, $G^{TMq} = \{G^{TM}_i\}^q$, $B^{TMq} = \{B^{TM}_i\}^q$, $Y^{TMq} = \{Y^{TM}_i\}^q$ We represent the collection of all aggregate quantile registers as:
$R^{TM} = \{R^{TMq}\}$, $G^{TM} = \{G^{TMq}\}$, $B^{TM} = \{B^{TMq}\}$, $Y^{TM} = \{Y^{TMq}\}$ If N is 10 and all four color channels are processed, we will have 84 aggregate quantile registers. There are four channels: R, G, B, Y. Each channel has (2N+1) separate registers. When N=10, the registers are −10, −9, −8, −7, −6, −5, −4, −3, −2, −1, 0, 1, 2, 3, 4, 5, 6, 7, 8, 9, 10.

For each pixel, each aggregate quantile register records the number of frames where the value of the channel calculated in the temporal metric calculation achieves that quantile value. By looking at the image data in terms of quantiles, a summary can be made across frames of motion picture data. The Quantile data provides a summary of information about the entire sequence.

The digital motion picture processor next keeps track of the frame number and the value of the largest and smallest metric observed over the entire collection of source frames 390. Temporal metric values less than zero correspond to dark defects and metric values greater than zero correspond to bright defects. The frame number and the largest and smallest metric observed at each pixel is used to indicate which frame the operator of the system should examine to understand the severity of the defect when reviewing the material on a digital motion picture monitor.

When the application starts, the maximum value register and minimum value register for each channel are initialized. The maximum value registers are initialized to −2. The minimum value registers are initialized to 2. (−2 and +2 are values, which cannot be achieved by the channels in the temporal metric calculations. The motion picture processing system then performs the following steps.

| Extrema definition | Extrema description |
| --- | --- |
| $Z_1 = \text{index}(C^{TM} > C^{Qmax})$ | the channel $C^{TM}$ is the temporal metric channel image. The index function returns a list of pixels where $C^{TM}$ is larger than the current value |
| $Z_2 = \text{index}(C^{TM} < C^{Qmin})$ | The index function returns a list of pixels where $C^{TM}$ is smaller than the current value. |
| $C^{Qmax}[Z_1] = C^{TM}[Z_1]$ | update the largest value found in this channel at each pixel |
| $D^{Qmax}[Z_1] = \text{frame}$ | update the frame where the largest value was found |
| $C^{Qmin}[Z_2] = C^{TM}[Z_2]$ | update the smallest value found in this channel at each pixel |
| $D^{Qmin}[Z_2] = \text{frame}$ | update the frame where the smallest value was found |

After processing each channel, the processor has determined the largest and smallest value found for each pixel as well as the frame number where these extrema were discovered.

The digital motion picture processor then checks to see if there is another frame in the sequence and processes the motion picture frame. 391 This process continues until all of the frames in the sequence have been processed.

For each channel being processed, a list of candidate defective pixels is determined. 392 A pixel is a candidate defect if its collection of aggregated quantiles satisfies a decision criteria. One decision criterion is that a sufficient number of quantile values must be greater than or less than a threshold. Another decision criterion is that the collection of quantile values matches or exceeds a pre-defined quantile collection.

Embodiments of the present invention, identify a candidate defect according to both persistence and severity. Persistence indicates the percentage of frames where the defect is visible. Severity indicates the magnitude of the defect. A human operator may request a list of pixels where the defect appears with a temporal metric of at least 0.5 in at least 75% of the frames. This corresponds to persistence=0.75 and severity=0.5.

To generate the list of bright candidate defective pixels, follow these steps:

| Bright Candidate definition | Bright Candidate description |
| --- | --- |
| $Z_1 = 0$ | initialize an array of pixel values to zero |
| for q = severity to N | for bright defects, loop over quantiles greater than or equal to the desired severity. |
| $Z_1 = Z_1 + F^{TM}$ | the running count of frames where the severity is at least the desired value. |
| end of for loop | iterate the loop for the next value of q |
| $Z_2 = Z_1/nf$ | the number of frames in the sequence is nf. $Z_2$ is the percentage of frames where the severity is at least the desired value. |
| $Z_3$ = index ($Z_2$ > persistence) | the index function returns the list of pixels where the persistence is greater than or equal to the desired value |

To generate the list of dark candidate defective pixels, follow these similar steps:

| Dark Candidate definition | Dark Candidate description |
| --- | --- |
| $Z_1 = 0$ | initialize an array of pixel values to zero |
| for q = −N to severity | for dark defects, loop over quantiles less than or equal to the desired severity. |
| $Z_1 = Z_1 + F^{TM}$ | the running count of frames where the severity is at least the desired value. |
| end of for loop | iterate the loop for the next value of q |
| $Z_2 = Z_1/nf$ | the number of frames in the sequence is nf. $Z_2$ is the percentage of frames where the severity is at least the desired value. |
| $Z_3$ = index ($Z_2$ > persistence) | the index function returns the list of pixels where the persistence is greater than or equal to the desired value |

After apply these steps, Z3, the list of candidate pixel is retained for each channel:

$R^{CL}, G^{CL}, B^{CL}, Y^{CL}$

The digital motion picture processor then assigns scores 393. The maximal or minimal values associated with each frame (i.e. frame number) are associated with each candidate pixel as defined in the preceding step.

To generate the score for each bright candidate pixels, the following steps are performed:

| Bright Score definition | Bright Score description |
| --- | --- |
| $Z_1 = C^{CL}$ | the pixels identified as bright candidates for the channel |
| $Z_2 = C^{Qmax}(Z_1)$ | the maximum value of the channel calculated in determining the pixel extrema evaluated at the list of pixels $Z_1$ |
| $Z_3 = F^{Qmax}(Z_1)$ | the frame number where the channel achieves its maximum value |

To generate the score for each dark candidate pixel, follow these steps:

| Dark Score definition | Dark Score description |
| --- | --- |
| $Z_1 = C^{CL}$ | the pixels identified as dark candidates for the channel |
| $Z_2 = C^{Qmin}(Z_1)$ | the minimum value of the channel calculated in determining the pixel extrema evaluated |
| $Z_3 = F^{Qmin}(Z_1)$ | the frame number where the channel achieves its minimum value |

Once the scores are generated for the sequence of frames, the processor can output to a graphical display, various information that can be presented to an operator to review the frames where the defects are most severe.

For each channel, the values Z1, Z2, and Z3 are reported to the human operator for review. This collection of data indicates the location of the candidate dead pixel, the most extreme score observed for that pixel, and the frame where that score is observed. The human operator can review the select different persistence and severity scores and review the resulting defect list. The human operator can then decide to repair some or all of the defective pixels.

The repair of the pixels can be performed using techniques known in the art including various filtering techniques, such as nearest neighbor calculations and weighted variations of nearest neighbor calculations. Provided below is an exemplary methodology for repairing the pixel values. This exemplary methodology is not to be considered as limiting the scope of the invention. The repair process can be controlled by an operator through the operator control module that provides a graphical user interface and accesses a repair module that may include computer code for repairing one or more pixels in one or more frames of the motion picture sequence.

In one embodiment, the frame and pixel location within the frame for a defective pixel is supplied to the repair module. The spatial metric data values are accessed or recalculated and the color channel to be processed for the defective pixel is identified by the largest spatial metric value for that pixel. It should be understood that the color channel with the largest spatial metric is indicative of the defect. If the spatial metrics from all color channels are sufficiently large, all three channels are processed. If all of the spatial metrics are above a threshold value, the sensor array may be experiencing a white imbalance.

In one embodiment of the invention, the repair module repairs the defective pixel by spatial interpolation of the color channel of interest. When processing black or white defects, all three color channels are processed independently. In one embodiment of the invention, a 7×7 region of interest centered on the pixel of interest is selected as shown in FIG. 6 A. The pixel of interest and its four nearest neighbors are repaired. The other pixels in the 7×7 neighborhood are used to estimate the repair values. The repairs are done at the native resolution of each color channel. In the case of Bayer patterned data, the three color channels may have different resolutions. The processing region is a 7×7 neighborhood centered at the defective pixel, indicated by d. In addition to repairing d, there are 4 additional central pixels labelled r that will be repaired. The remaining pixels are used to estimate the repair values.

Figures 6A, 6B:
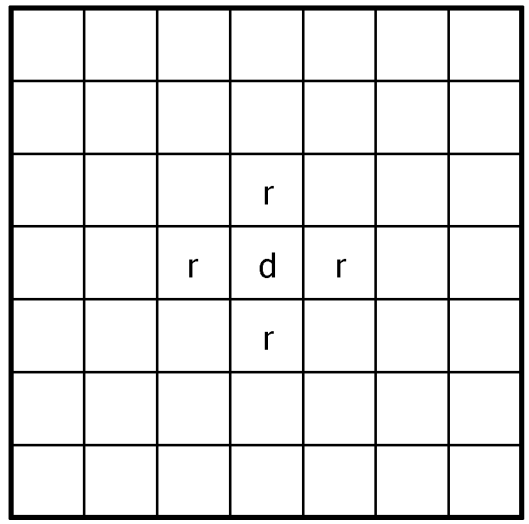
FIG. 6A shows a 7×7 region of interest centered on the pixel of interest used for repairing the pixels.
FIG. 6B shows a 7×7 region for estimating the parameters of the repair with assigned relative offsets.

To estimate the parameters of the repair in this embodiment of the repair process, relative offsets are assigned to the 49 pixels in the 7×7 neighborhood as shown in FIG. 6B. In FIG. 6B, each pixel in the neighborhood is assigned a vector x=(x1, x2). Each pixel also has an observed image value y on the channel of interest. Pixels marked with * are used to estimate the repair parameters. Pixels without a * are repaired. Referring to the vectors x=(x1, x2) in FIG. 6B, a 44×6 matrix called X is created. All pixels indicated by a * have an entry in X. Each row of X is of the form:

| $X_1^2$ | $X_2^2$ | $X_1$ | $X_2$ | $X_1 X_2$ | 1 |
|---|---|---|---|---|---|

Figure 8:
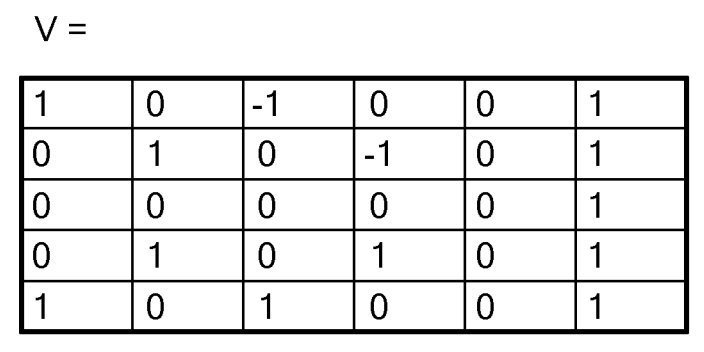

So moving through FIG. 6B from left to right and top to bottom, the matrix X looks like FIG. 7. Similarly, a 5×6 matrix V representing the 5 central pixels of the region is shown in FIG. 8. The pixels contributing to V represent the 5 pixels to be repaired.

An 8×6 matrix W is defined representing the 8 pixels surrounding the repair region in FIG. 9. The pixels contributing to W provide a means to seamlessly blend the repair into the background. FIG. 9B is the 7×7 region surrounding the pixel of interest. The pixels labeled v will be repaired and contribute to the matrix V. The pixels labeled w are used to blend the repair into the background and contribute to the matrix W.

The data used to estimate the repair parameters is a 44×1 vector called Y. The values of Y are extracted from the channel of interest in the same order as the matrix X.

The 6×44 matrix Z according to the formula:

$$Z=(X'X)^{-1}X'$$

In this case, the transpose of Z is shown in FIG. 10-1, 10-2.

The parameters of the repair is a 6×1 vector called B defined as:
B=ZY.
The repair values R are calculated as:
R=VB.
The blend values S are calculated as:
S=WB.

R is a 5×1 vector of repair values. S is an 8×1 vector of values used to blend the repair into the background. FIG. 11 shows how the repair and blend values are applied to the pixels surrounding the pixel of interest in the channel of interest. Values are extracted from the 5×1 vector R and used to replace the pixel values surrounding the pixel of interest. Values are extracted from the 8×1 vector S and blended with the original pixel values.

Once all of the pixels that are designated for repair by the operator for an image are repaired, the motion picture image data for the image is stored to memory. This process can be continued until all of the frames of the sequence are repaired. The repaired and updated sequence can then be recalled from memory for play back or for further editing.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), pre-loaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

While the invention has been particularly shown and described with reference to specific embodiments, it will be understood by those skilled in the art that various changes in form and detail may be made therein without departing from the spirit and scope of the invention as defined by the appended clauses. As will be apparent to those skilled in the art, techniques described above for panoramas may be applied to images that have been captured as non-panoramic images, and vice versa.

Embodiments of the present invention may be described, without limitation, by the following clauses. While these embodiments have been described in the clauses by process steps, an apparatus comprising a computer with associated display capable of executing the process steps in the clauses below is also included in the present invention. Likewise, a computer program product including computer executable instructions for executing the process steps in the clauses below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer implemented method for checking a motion picture sensor array during filming of a motion picture, the method comprising:

receiving into a digital motion picture processor a sequence of motion picture frames of pixel data to be analyzed;

creating a spatio-temporal representation of the pixel data;

analyzing the spatio-temporal representation of the pixel data to determine if the representation exceeds a threshold;

in response to an operator's selection on a digital display, displaying for evaluation by the operator one or more selected frames of pixel data that have an associated spatio-temporal representation that exceeds the threshold indicating that there is at least one defective pixel within the frame; and providing to the operator a graphical display allowing the operator to select either to repair and store the repaired frame with the sequence of motion picture frames of pixel data or just store the sequence of motion picture frames of pixel data.

* * * * *